United States Patent
Namai et al.

(10) Patent No.: US 6,833,147 B2
(45) Date of Patent: Dec. 21, 2004

(54) METHOD AND AN APPARATUS FOR SHAPING A DOUGH PIECE

(75) Inventors: Yukio Namai, Utsunomiya (JP); Ritsuro Nakabayashi, Utsunomiya (JP); Hiroshi Ebata, Utsunomiya (JP)

(73) Assignee: Rheon Automatic Machinery Co., Ltd., Utsunomiya (JP)

( * ) Notice: Subject to any disclaimer, the term of this patent is extended or adjusted under 35 U.S.C. 154(b) by 423 days.

(21) Appl. No.: 09/961,434

(22) Filed: Sep. 25, 2001

(65) Prior Publication Data

US 2002/0037348 A1 Mar. 28, 2002

(30) Foreign Application Priority Data

Sep. 26, 2000 (JP) ....................................... 2000-093190

(51) Int. Cl.[7] ............................. A21C 11/00; A21D 8/02
(52) U.S. Cl. ..................... 426/231; 425/145; 425/321; 425/392; 425/397; 426/500; 426/512
(58) Field of Search ................................. 426/231, 500, 426/512, 145, 321, 392, 397

(56) References Cited

U.S. PATENT DOCUMENTS

| | | | | |
|---|---|---|---|---|
| 4,036,569 A | * | 7/1977 | Oshikiri | 425/397 |
| 4,634,363 A | | 1/1987 | Pivonka | 425/306 |
| 4,961,697 A | * | 10/1990 | De Fockert et al. | 425/397 |
| 5,421,714 A | * | 6/1995 | Morikawa et al. | 425/321 |

FOREIGN PATENT DOCUMENTS

| | | |
|---|---|---|
| EP | 0 490 190 | 6/1987 |
| EP | 0 329 235 | 8/1989 |
| EP | 053 16923 | 3/1993 |
| GB | 835240 | 5/1960 |
| JP | 48-31292 | 4/1973 |
| JP | 48-96779 | 12/1973 |
| JP | 5-316923 | 12/1993 |

* cited by examiner

Primary Examiner—George C. Yeung
(74) Attorney, Agent, or Firm—Finnegan, Henderson, Farabow, Garrett & Dunner L.L.P.

(57) ABSTRACT

An apparatus for bending a bar-like dough piece into substantially an M-shaped piece. A conveying section (2) continuously conveys bar-like dough pieces (1) in a traveling direction that is orthogonal to the length of the bar-like dough piece (1). Each incoming bar-like dough piece (1), whose length is measured by photosensors (38), is centered by a centering device in a centering section (3) based on the measured length of it A forming section (4) bends the centered bar-like dough piece (1) with a centrally located bending member and two bending members symmetrically located with respect to the center of the length of the bar-like dough piece. Because the symmetrically located bending members are oriented inversely with respect to the centrally located bending member, the bar-like dough piece (1) is formed into an M-shaped piece. The bending members can be varied depending on the length of the bar-like dough piece, and the distances of the movement, in the traveling direction, of the bending members are adjustable.

10 Claims, 6 Drawing Sheets

METHOD AND AN APPARATUS FOR SHAPING A DOUGH PIECE

FIELD OF THE INVENTION

This invention relates to a method and an apparatus for shaping a dough piece, and in particular to a method and an apparatus for shaping a bar-like dough piece into a bent one.

BACKGROUND OF THE INVENTION

It has been proposed to use a bending machine to modify a bar-like bread dough piece into a bent, e.g., an M-shaped, one.

Examples of the conventional bending machines are disclosed in Japanese Patent Early-Publications Nos. 48-96779 (Itoh) and 5-316923 (Yamazaki et al.), and Japanese Utility Model Early-Publication No. 48-31292 (Kuroha).

Itoh discloses a bending machine to modify a bar-like bread dough piece into an M-shaped one. The machine includes a conveyor for conveying the bar-like piece along a direction that is orthogonal to the length of the bar-like piece, and a bending mechanism located at the end of the conveyor. The bending mechanism includes a stopper for stopping the progress of the center portion of the bar-like piece on the conveyor, and a pair of brakes for stopping the progress of both ends of the bar-like piece. Above the conveyor, the bending mechanism also includes a pair of ratchet wheels, which has teeth for pushing the portions to be bent, which wheels are located between the center portion and both ends of the bar-like piece. The ratchet wheels rotate around a rotary shaft that extends the length of the bar-like piece in such a way that the teeth of the ratchet wheels contact and push the corresponding positions of the bar-like piece on the conveyor in the traveling direction. When the teeth of the ratchet wheels push the bent portions of the bar-like piece on the conveyor in the traveling direction, the center portion of the bar-like piece is stopped by the stopper and both ends of it are stopped by the brakes. Therefore, the incoming bar-like piece on the conveyor is formed into an M-shaped one by the bending mechanism.

This forming process, however, is unreliable, since each tooth of the ratchet wheels supports the corresponding bent portion of the bar-like piece only by point contact. Further, the rotary teeth of the ratchet wheels tend to scratch the M-shaped piece.

To remove these problems involved in the ratchet wheels, Yamazaki proposed to replace the ratchet wheels in Itoh with a pair of pivotaling rods, which extend in the direction of the thickness of the bar-like piece on the conveyor. In that process, the pivoting rods fall on the relevant positions of the bar-like piece in such a way that each pivoting rod supports the bar-like piece through a line contact. Once the bar-like piece has been formed into an M-shaped one, the pivoting rods pivot away from the M-shaped piece opposite the direction the conveyor is travelling.

Besides what Yamazaki has proposed, Kuroha proposed a movable damper which moves on the conveyor faster than does the conveyor, instead of the ratchet wheels of Itoh. Kuroha also proposed a detector for detecting the position of the dough on the conveyor to control the movable damper based on the signal from the detector.

Unfortunately, Yamazaki and Kuroha have difficulty in producing a symmetrical and well-balanced M-shaped piece. In particular, if the continuously fed bar-like pieces include undesired varying sizes, this difficulty increases. Thus, bread products that have been fermented and baked have a non-uniform shape.

Therefore, it is advantageous to provide an apparatus and a method to accurately change a bar-like dough piece into a bent and shaped one.

SUMMARY OF THE INVENTION

The present invention addresses the aforementioned problems by providing an apparatus for bending a bar-like dough piece extended along its length into a predetermined form. The apparatus comprises conveying means for continuously conveying bar-like dough pieces thereon in a traveling direction that is orthogonal to the length of each bar-like dough piece; bending means for bending each incoming bar-like dough piece symmetrically or asymmetrically with respect to the center of the length of the incoming bar-like dough piece; and replacing means for replacing at least one of the relationships of the relative dispositions in the length of the bar-like dough piece of the bending means and the incoming bar-like dough piece with a predetermined relationship of a disposition relative to them.

In one aspect of this invention, the predetermined relationship is determined so that the bending means bends the bar-like dough piece with a load substantially centrally located in the length of the bar-like dough piece. If this bar-like dough piece is to be further bent symmetrically with respect to the center of it, the predetermined relationship may also be determined so that the bending means bends the bar-like dough piece with loads substantially symmetrically located respect to the center of the bar-like dough piece, wherein the substantially symmetrically located loads are orientated inversely with respect to the substantially centrally located load. The resulting bent dough piece takes, e.g., an M-shape.

In another aspect of the invention, the predetermined relative position is determined so that the bending means bends said bar-like dough piece with an off-center load in respect to the center of the length of said bar-like dough piece. If this bar-like dough piece is to be further bent asymmetrically with respect to the center of it, the predetermined relative position may also be determined so that the bending means bends said bar-like dough piece with loads asymmetrically located with respect to the center of the length of said bar-like dough piece, wherein the asymmetrically located loads are orientated inversely with respect to said substantially centrally located load. The resulting bent dough piece takes, e.g., substantially an M-shape.

The present invention also provides an apparatus for bending a bar-like dough piece extended in its length into a predetermined form. The apparatus comprises conveying means for continuously conveying bar-like dough pieces thereon in a traveling direction that is orthogonal to the length of the bar-like dough piece; a first pushing means for pushing the bar-like dough piece on a first position that is located in said length of said bar-like dough piece; a first aligning means for aligning said first position of the dough piece with the first pushing means; a second pushing means for pushing the bar-like dough piece on the second of two positions that are located on said length of the bar-like dough piece, wherein the forces of said second pushing means to be applied to the second of two positions of the bar-like dough piece are orientated inversely with respect to the force of said first pushing means to be applied to the first position; and a second aligning means for aligning the second positions of said dough piece with the second pushing means.

The apparatus preferably comprises means for temporarily holding the conveyed bar-like dough piece and means for detecting both ends of the length of the temporarily held bar-like dough piece. The first aligning means may align both detected ends at predetermined positions. They correspond to imaginary ends of both ends of the bar-like dough piece. The first position can be either substantially positioned centrally or off-center on the bar-like dough piece.

The apparatus may also comprise means for measuring the length of the bar-like dough piece based on both said detected ends. To more appropriately control the bending process, the apparatus preferably comprises means for determining the degree of the pushing with the second pushing means against the second positions of the dough piece based on the measured length of the bar-like dough piece, and means for controlling the actual degree to be pushed with the second pushing means against the second position of the dough piece based on said determined degree. The measured length of the bar-like dough piece can also be used for an alternative alignment of the first aligning means so that the first position is either substantially positioned centrally or off-center on the bar-like dough piece.

The present invention also provides a method for bending a bar-like dough piece having a length into a predetermined form. The method comprises the steps of:
(a) continuously conveying bar-like dough pieces in a traveling direction that is orthogonal to the length of each said bar-like dough pieces;
(b) determining a plurality of actual positions from which each said bar-like dough piece is to be bent on the length of said bar-like dough piece;
(c) substituting said determined actual positions with predetermined positions; and
bending each incoming bar-like dough piece at said predetermined positions symmetrically or asymmetrically with respect to the center of said length of said incoming bar-like dough piece.

Additional features, advantages, and objectives of this invention will be set forth in the description which follows and in part will be apparent from it, or may be learned by practicing the invention.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below serve to explain the principles of the invention.

DESCRIPTION OF THE PREFERRED EMBODIMENTS

Figure 1:
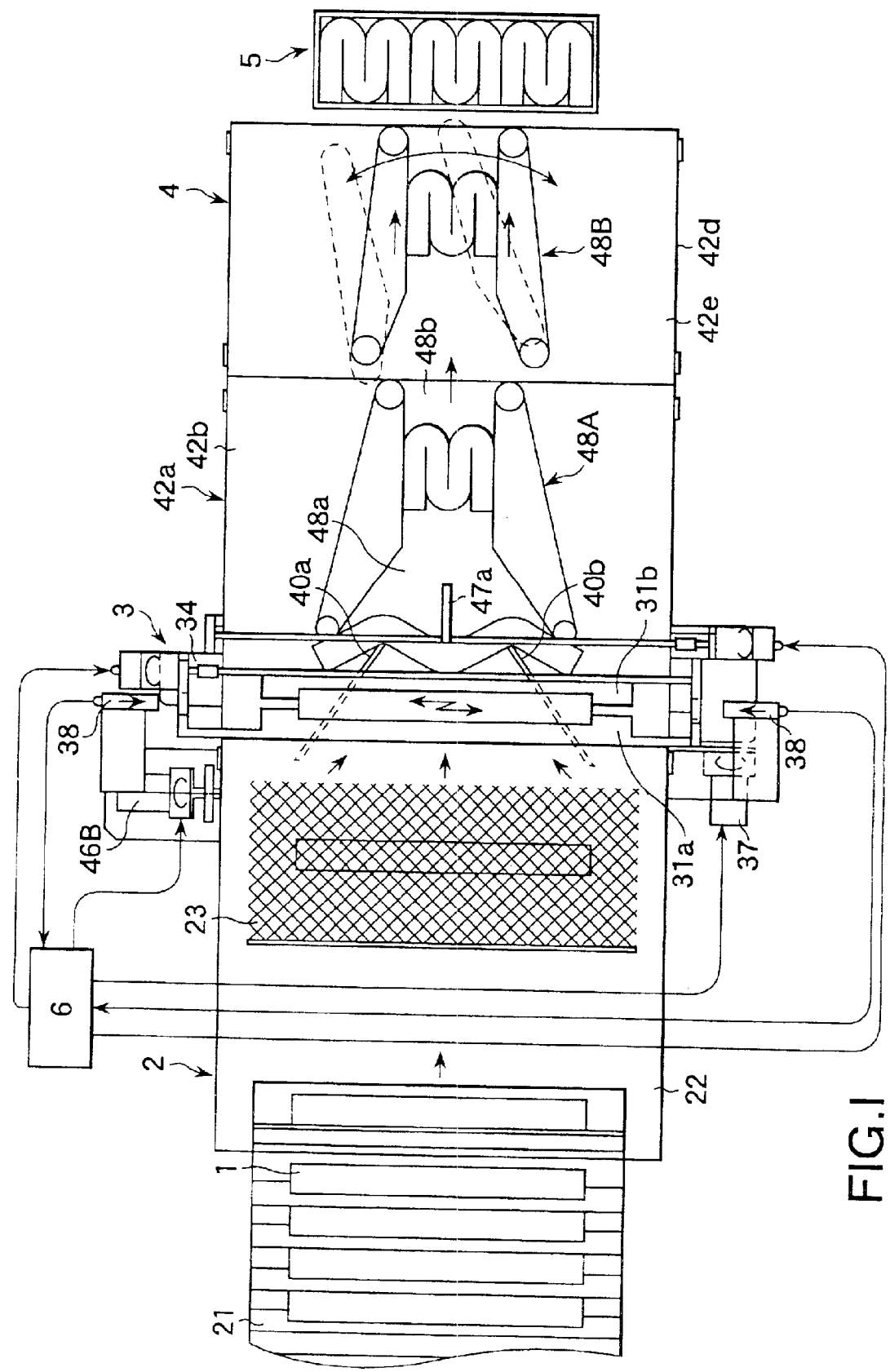
FIG. 1 shows a schematic plane view of the apparatus of the first embodiment of the present invention.

Turning now to the drawings, wherein the same elements or similar functional elements are designated by like reference numerals, FIGS. 1–5 show the first embodiment of a bending machine of the present invention adapted to produce M-shaped bread dough pieces.

Although a plurality of bread dough pieces 1 are continuously fed to the machine, each dough piece 1 has been formed into a bar-like form in the preceding step with a known forming machine (not shown).

Figure 2:
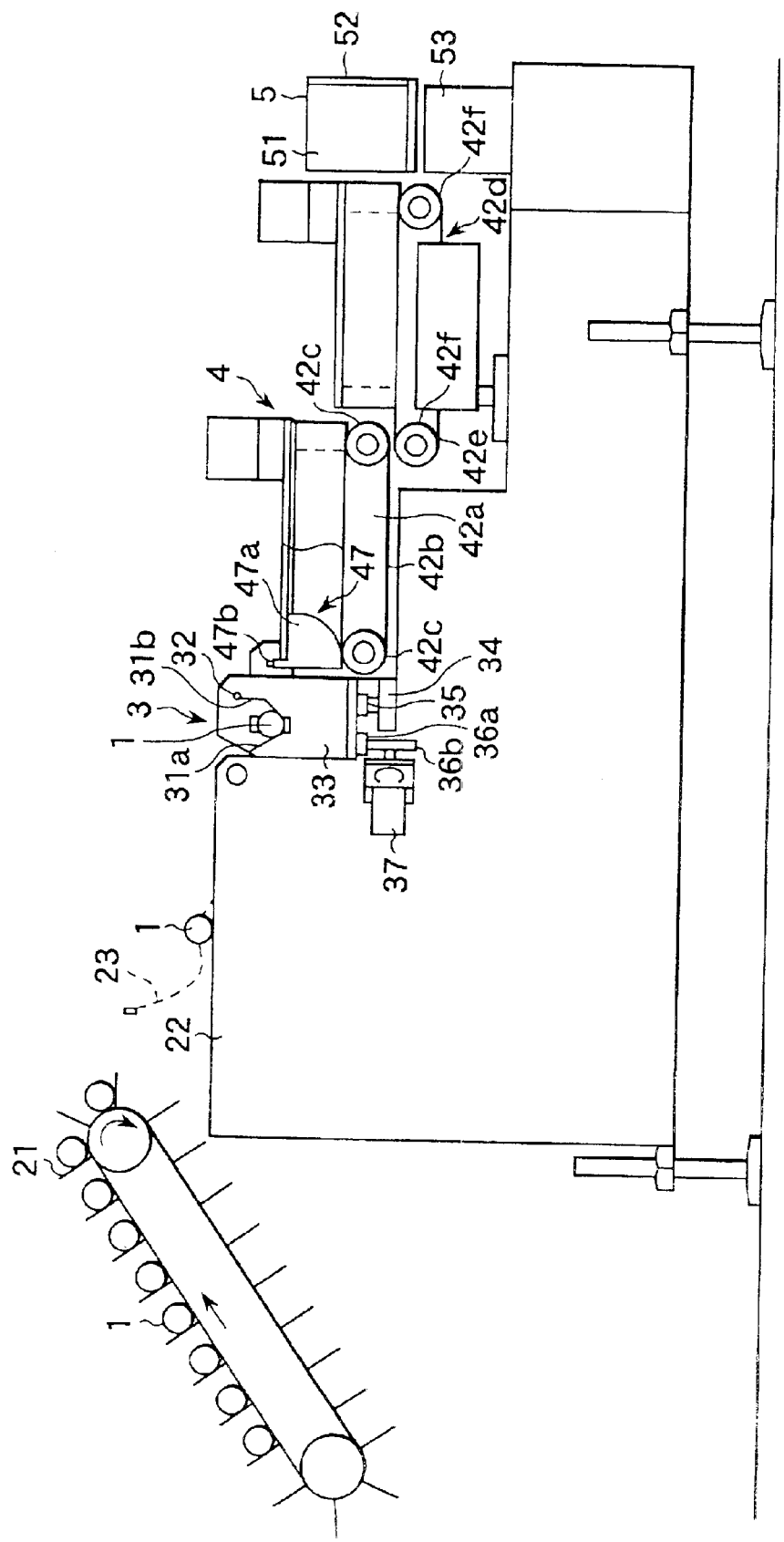
FIG. 2 shows a schematic side view of the apparatus of FIG. 1.

In reference to FIGS. 1 and 2, the bending machine of the invention generally comprises, from its upstream end to its downstream end, a conveying section 2 for continuously conveying a plurality of bar-like dough pieces 1, a centering section 3 for centering each incoming bar-like dough piece 1, a forming section 4 for forming the centered piece 1 into an M-shaped piece, and a product receptacle 5, which communicates with a product holder 53. The product holder 53 receives a predetermined number of M-shaped pieces arranged in a row and holds them during the following process or processes. As in this embodiment, if the bar-like dough pieces 1 are bread dough pieces, the following process, in which the holder 53 holds the dough pieces, includes fermentation and baking steps.

The machine also includes a controller 6 for controlling the bending of the pieces 1.

The conveying section 2 includes a first conveyor 21 for receiving bar-like pieces 1 that are continuously fed from the preceding station and for conveying them in a traveling direction designated by an arrow in such a way that the length of each bar-like piece 1 is aligned orthogonally to the traveling direction. The conveying section 2 also includes a second conveyor 22, which runs from adjacent the leading end of the first conveyor 21, for receiving the incoming bar-like piece 1 from it, and a mesh 23, located above the second conveyor 22, for further forming the incoming bar-like piece 1 on the second conveyor 22 into a more accurate and bar-like form. The traveling direction of the second conveyor 22 is the same as the traveling direction of the first conveyor 21, as designated by an arrow.

The centering section 3 has a pair of centering plates 31a, 31b for temporarily holding the incoming bar-like piece 1. The centering plates 31a, 31b are positioned adjacent the leading end of the second conveyor 22 and are arranged together substantially to form a V-shape in a vertical cross-section. But the lower ends of them are spaced apart from each other. The centering plate 31b, whose upper end is pivotally mounted on a rotatable shaft 32, is pivotally rotated around it. The rotatable shaft 32 is rotatably supported on a movable base 33, which is movably mounted on rails 35 that are supported on a frame 34 of the second conveyor 22. The rails 35 and the movable base 33 are moved orthogonally to the traveling direction of the second conveyor 22. Hereinafter, the direction in which the movable base 33 moves is referred to as the "direction of the width."

The movable base 33 is provided with a rack 36a that is engaged with a pinion 36b. The pinion 36b is rotatably mounted on a shaft of a motor 37, which is mounted on the frame 34. When the motor 37 rotates, the movable base 33, and thus the centering plates 31a, 31b, move in the direction of the width. On the outer sides of the pair of the centering plates 31a, 31b in the direction of the width, detectors, typically photosensors 38, are provided for detecting the positions of both ends of the incoming bar-like dough 1 at the centering plates. The photosensors 38 provide the detecting signals to the controller 6.

Figure 3:
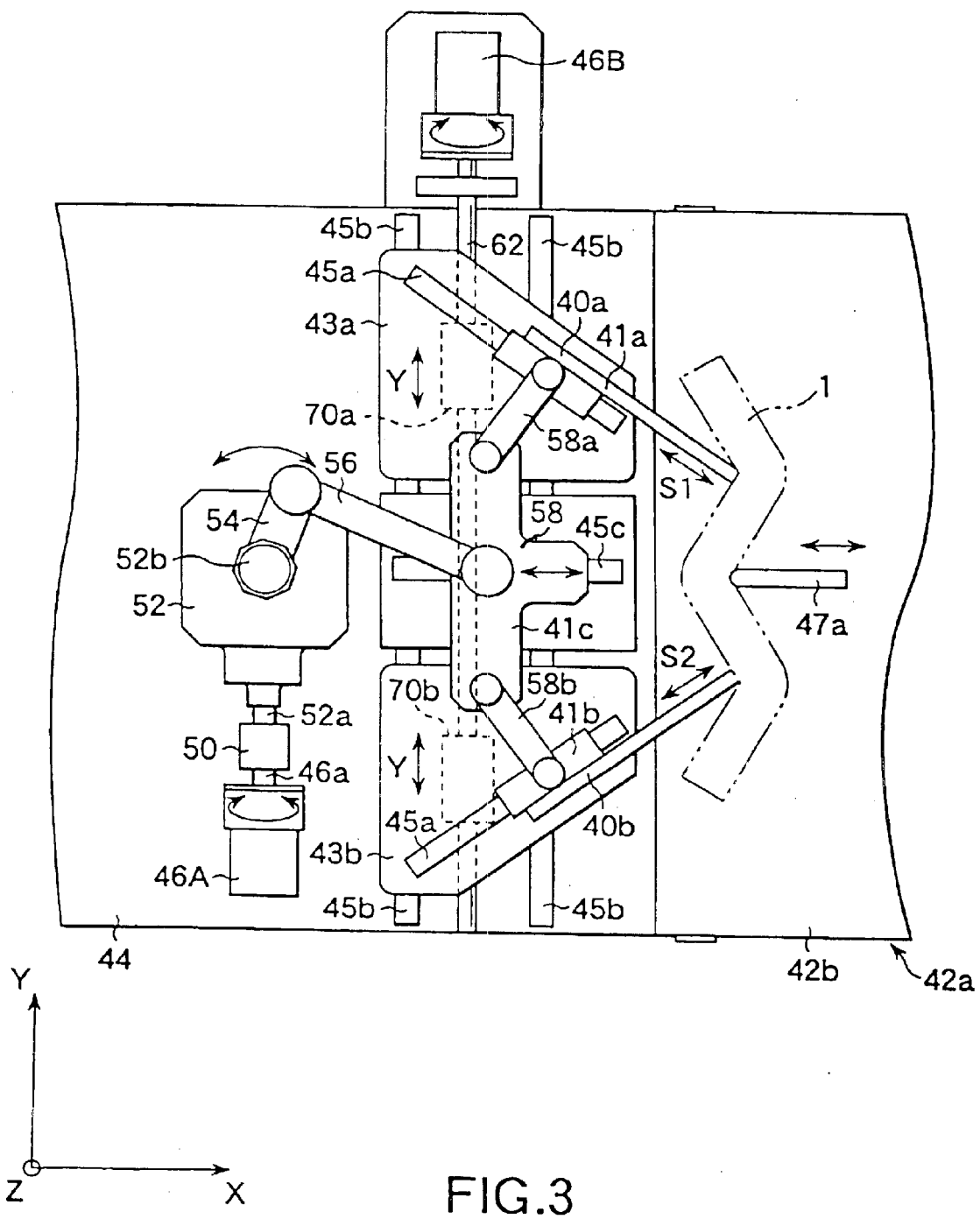
FIG. 3 shows a detailed plane view of a forming section of the apparatus of FIG. 1.

As shown in FIG. 3, the forming section 4 includes a pair of pushing plates 40a and 40b and their first and second driving mechanisms, and a third conveyor 42a, which runs from adjacent the leading end of the second conveyor 22, for receiving the incoming bar-like piece 1 from it. The third conveyor 42a includes an endless belt 42b running around a pair of pulleys 42c (FIG. 2).

The traveling direction of the third conveyor 42a is the same as the traveling direction of the second conveyor 22. Planes on which the bar-like pieces 1 are located of the first, second, and third conveyors 21, 22, and 42a are located in substantially the same plane. In FIG. 3, the traveling direction of the third conveyor 42a is shown in the X direction, the direction of the width is shown in the Y direction, and the Z direction (the vertical direction) is shown orthogonally to the X and Y directions.

Each pushing plate 40a and 40b is supported on the corresponding support bases 41a and 41b. The support bases 41a and 41b are slidably mounted on first bases 43a and 43b via first linear-bearings 45a and 45b thereon in such a way that that they can slidably move to and from the second conveyor 22 in the X direction. In turn, the first bases 43a and 43b are slidably mounted on a second base 44 via a pair of second linear-bearings 45b thereon in such a way that the first bases 43a and 43b, and thus the pushing plates 40a, 40b, can slidably reciprocate in the Y direction as indicated by arrows Y. The pushing plates 40a and 40b also reciprocate in a direction indicated by an arrow S1 and a direction indicated by an arrow S2, respectively. The S1 and S2 directions are arranged so that they substantially and symmetrically converge in the X direction.

The reciprocating movements in the S1 and S2 directions of the first bases 43a and 43b are driven by a first motor 46A through a first driving mechanism, as described below.

In the first driving mechanism, a mechanical coupling 50 couples an output shaft 46a of the first motor 46A to an input shaft 52a of a gearbox 52, in which are journaled the input shaft 52a and an output shaft 52b in an orthogonal relation via a gear mechanism (not shown). That is, the output shaft 46a of the first motor 46A and the input shaft 52a of the gearbox 52 extend in the Y direction, while the output shaft 52b of the gearbox 52 extended in the Z direction.

The end of the output shaft 52b that is outside the gearbox is pivotally connected to one end of a first arm 54. In turn, the other end of the first arm 54 is pivotally connected to one end of a second arm 56. A T-shaped connecting member 58 is drivingly connected to the other end of the second arm 56 in a partly overlapped relation to the first bases 43a and 43b and therebetween. The T-shaped connecting member 58 is slidably mounted on a third linear-bearing 45c, which extends in the X direction in such a way that it can slidably move in the X direction. The third linear-bearing 45c is provided on a third base 43c, which is supported between the first bases 43a and 43b and above the second base 44. The pushing plates 40a and 40b are pivotally connected to both ends of the T-shaped connecting member 58 via third arms 58a and 58b, respectively.

When the motor 46A rotates forward or backward, the first arm 54 and the second arm 56 are pivotally moved to cause the reciprocating movement of the T-shaped connecting member 58 in the X direction. The reciprocating movement of the T-shaped connecting member 58 in the X direction causes reciprocating movements of the pushing plates 40a and 40b in the directions indicated by arrows S.

Figure 4:
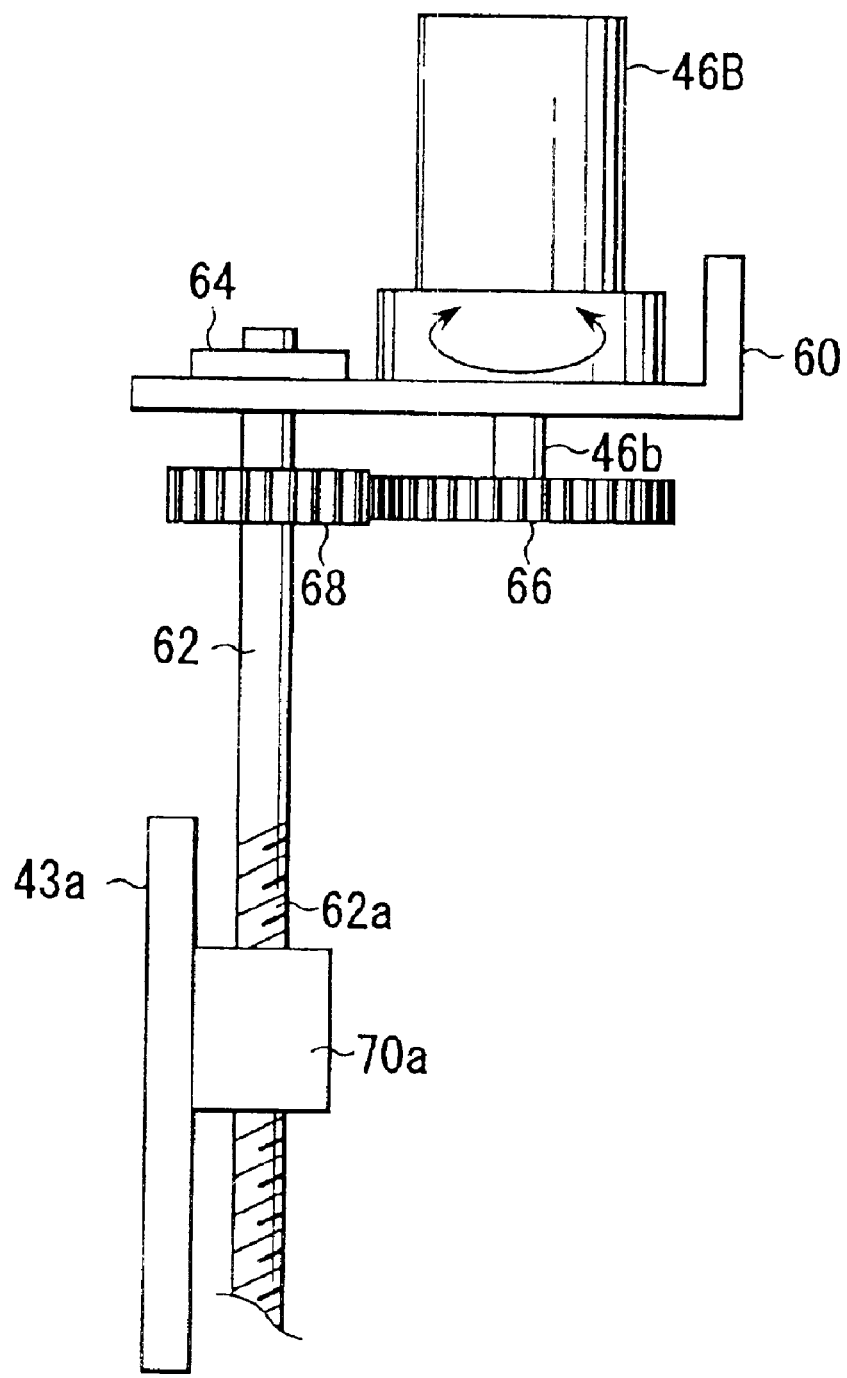
FIG. 4 shows a second motor and its transmission under a first base of FIG. 1, the first base being removed.

The second mechanism includes a second motor 46B. As shown in FIG. 4, it is mounted on a mount 60 through which an output shaft 46b from it extends in the Y direction. The mount 60 also rotatably supports via a bearing 64 a threaded shaft 62, which extends in the Y direction under the first bases 43a and 43b. The threaded shaft 62 is driven through a gear 68, which meshes with the gear 66 driven by an output shaft 46b of the motor 46B. The threaded shaft 62 extends thorough a nut 70a mounted under the first base 43a and a nut 70b mounted under the first base 43b. (While only one nut 70a is shown in FIG. 4 by a solid line, two nuts 70a, 70b are shown in FIG. 3 in dotted lines.) The nut 70a can have a forwardly threaded hole (not shown) and the nut 70b can have a reversely threaded hole (not shown), and vice versa. Therefore, the portions 62a of the threaded shaft 62 that mesh with the thread holes of the nuts 70a and 70b are forwardly threaded and reversely threaded (only one portion 62a of the threaded shaft 62 is shown in FIG. 4). When the second motor 46B rotates, the threaded shaft 62 also rotates, to increase or decrease the distance between the first bases 43a and 43b based on the direction of the rotation of the second motor 46B. The pushing plates 40a and 40b on the first bases 43a and 43b thus move in the Y direction.

Provided between the centering section 3 and the third conveyor 42a of the forming section 4 is a stopper 47, which has a bar 47a that is pivotally mounted on a rotary shaft 47b, which extends in the Y direction. The bar 47a is selectably positioned between a position where it engages and stops the piece 1 and a position where it disengages a piece 1, based on the positions of the rotation of the rotary shaft 47b. When the bar 47a contacts and stops the incoming piece 1, it bends it, since it applies a load to the bar-like piece.

Note that the force of the bar 47a to be applied to the first position of the bar-like piece 1 is orientated inversely with respect to the forces of the pushing plates 40A and 40B, which forces are to be applied to the second positions in order to form the bar-like piece 1 into an M-shaped one.

On the belt 42b of the third conveyor 42a, a pair of first vertical conveyor belts 48A, 48B is provided downstream of the stopper 47 in such a manner that the planes of them are orthogonal to the plane of the belt 42b of the third conveyor 42a. The pair of first vertical conveyor belts 48A is also arranged to define a funnel-shaped passage between them, as viewed from above the plane of the third conveyor 42a. The funnel-shaped passage of the first vertical conveyors belts 48A includes, in the conveying direction, a receiving space 48a for receiving and gripping a piece 1, which is subject to be formed into an M-shape in a manner described below, between the pair of the first vertical conveyors belts 48A, and a narrow passage 48b for conveying the piece 1 that has been formed into an M-shape.

The forming section 4 also includes a fourth conveyor 42d, which runs under the leading end of and adjacent the third conveyor 42a, for receiving the piece 1 that has been formed into the M-shape. The fourth conveyor 42d includes an endless belt 42e entrained around a pair of pulleys 42f (FIG. 2). The traveling direction of the fourth conveyor 42d is the same as the traveling direction of the third conveyor 42a.

On the belt 42e of the fourth conveyor 42d, a pair of second vertical conveyor belts 48B is provided in such a manner that the planes of them are orthogonal to the plane of the belt 42 of the fourth conveyor 42d. Similarly to the first vertical conveyor belts 48A, the second vertical conveyors belts 48B are also arranged to define a funnel-shaped passage between them, as viewed from above the belt 42e of the fourth conveyor 42d. The funnel-shaped passage of the second vertical conveyor belts 48B receives the incoming M-shaped piece from the third conveyor 42A and discharges it to the product receptacle 5.

As shown in FIG. 2, the product receptacle is provided with a storage chamber 51 for temporarily storing a plurality of M-shaped pieces 1. The storage chamber 51 has a bottom opening 52 and a shutter (not shown). It opens and closes the opening 52. Under the bottom opening 52, the product holder 53 is movably placed.

Now the operation of the bending machine will be explained.

As shown in FIG. 1, the bar-like pieces 1 are continuously fed into the conveying section 2 by the first conveyor 21. Then the bar-like pieces 1 are carried forward on the second conveyor 22, while they are formed into a more regular bar-like form with the mesh 23. The bar-like pieces 1 are then fed to the centering section 3 in such a way that the lengths of them are substantially orthogonal to the X direction. In other words, the lengths of the bar-like pieces 1 are extended in the Y direction.

The incoming bar-like piece 1 on the centering section is then dropped into the passage between the centering plates 31a and 31b and held therebetween. At this time, the photosensors 38 detect the positions of both ends of the incoming bar-like piece 1, which is gripped between the centering plates 31a and 31b, and thus provide the detecting signal to the controller 6.

The controller 6 compares the positions detected by the photosensors 38 with the predetermined reference positions for both ends of the bar-like piece 1 that is gripped between the centering plates 31a and 31b. As the result of this comparison, the controller 6 moves the movable base 33 and thus the centering plates 31a and 31b so as to reposition the actual positions of both ends of the bar-like piece 1 to the predetermined reference positions. Thus, the bar-like piece 1 that is gripped between the centering plates 31a and 31b is centered. In this embodiment, the center of the bar-like piece 1 is in its right position. Then the rotary shaft 32 is rotated to open the opening that is formed by the lower ends of the centering plates 31a, 31b. The bar-like piece 1 then drops onto the third conveyor 42a of the forming section 4.

In reference now to FIGS. 5A to 5E, the processes for forming the dropped bar-like piece 1 on the third conveyor 42a into on M-shaped piece are described.

Figure 5A:
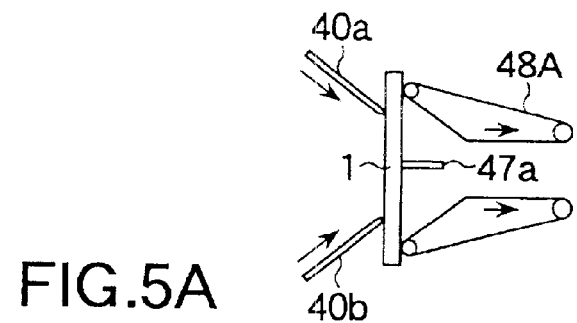
FIGS. 5A–5E show the steps of forming a bar-like dough piece into an M-shaped dough piece with the forming section in the first embodiment.

The pushing plates 40a, 40b move downstream to push the second positions of the bar-like piece 1, while the bar 47a of the stopper 47 engages the first position of the bar-like piece 1 and stops its movement (FIG. 5A).

Figure 5B:
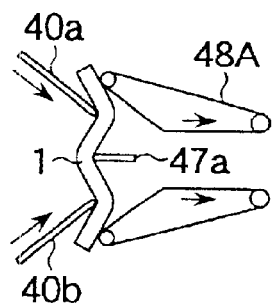

These cooperative actions of the pushing plates 40a, 40b and the stopper 47 start modifying the bar-like piece 1 into an M-shaped piece. In this step, the stopper 47 bends the bar-like piece 1 with a substantially centrally located load, while the pushing plates 40a, 40b bend the bar-like piece 1 with substantially symmetrically located loads with respect to the center of the length of the bar-like piece 1 (FIG. 5B).

Figure 5C:
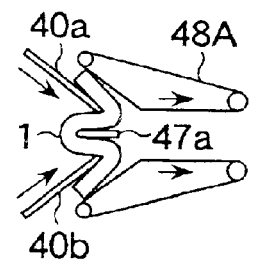

As the pushing plates 40a, 40b move further downstream to push the second positions of the piece 1, the shape of the piece 1 becomes closer to an M-shape and the piece 1 becomes gripped between the receiving space 48a of the first vertical conveyor belts 48 (FIG. 5C).

Figure 5D:
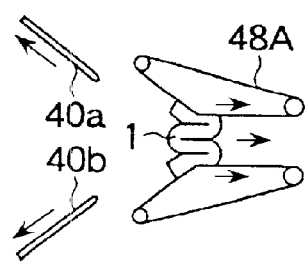

Once the bar-like piece 1 is formed into an M-shaped piece, the stopper 47 pivotally rotates away from the position shown in FIG. 5C to the second position, where the bar 47a is removed from the bar-like piece 1 (FIG. 5D).

Figure 5E:
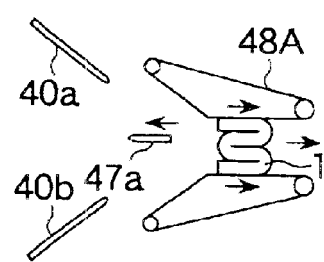

The M-shaped piece 1 then passes through the narrow passage 48b of the first vertical conveyor belts 48A such that it becomes even closer to an M-shape (FIG. 5E).

The controller 6 can measure the length of the bar-like piece 1 based on the signal from the photosensors 38 and thus can determine the appropriate second positions for the measured length of the bar-like piece 1.

The pushing plates 40a, 40b can be moved onto in these appropriate second positions, since they can be moved in the Y direction. The degree of the pushing of the pushing plates 40a, 40b against the piece 1 may be adjusted based on the length of the bar-like piece 1 such that a well balanced M-shaped piece may be produced.

In reference again to FIG. 1, the piece 1 that has been formed into the M-shaped piece shown in FIG. 5E is then dropped onto the fourth conveyor 42d from the third conveyor 42a. The dropped M-shaped piece 1 then passes through the funnel-shaped passage between the second vertical conveyor belts 48B to the product receptacle 5, while its M-shaped form is maintained.

Preferably the second vertical conveyors belts 48B and thus its funnel-shaped passage can pivotally move in the width direction (as shown in dotted lines in FIG. 1) so that the continuously incoming M-shaped pieces 1 are shifted to the right or left side in the width direction. This action facilitates an arrangement for continuously feeding M-shaped pieces into the product holder 53.

Although the bar-like piece 1 in the above embodiment is formed into an M-shape, the bar-like piece 1 may be formed into a different shape, e.g., as N-shape.

FIGS. 6A–6E show a bending machine of the second embodiment of the invention to form the bar-like piece 1 into an N-shaped piece. With respect to the center of the piece 1, the N-shaped piece is asymmetrical, whereas the M-shaped piece in the first embodiment is symmetrical. Therefore, in this embodiment, an alternative forming section for forming the bar-like piece 1 into an N-shaped piece is provided instead of the forming section 4 for the M-shaped piece of the first embodiment. The remaining sections of the bending machine of the second embodiment are the same as those in the first embodiment.

Figure 6A:
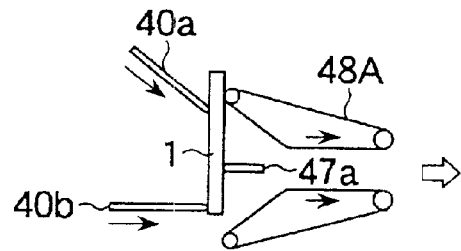
FIGS. 6A–6E show the steps of modifying a bar-like dough piece into an M-shaped dough piece with the alternative forming section in the alternative embodiment.

As shown in FIG. 6A, in the alternative forming section, the bar 47a of the stopper is located at a first position that is off-center with respect to the center of the bar-like piece 1. The pushing plates 40a and 40b are asymmetrically arranged at second positions that are asymmetrically positioned with respect to the center position of the bar-like piece 1. Pushing plate 40a is arranged in the same way as that in the first embodiment. Pushing plate 40b is arranged such that it pushes one end of the bar-like piece 1 in the Y direction, and the pushing plate 40b is located at one end of the bar-like piece 1.

The pushing plates 40a, 40b move downstream to push the bar-like piece 1 an the second positions, while the bar 47a of the stopper 47 stops the first position of the bar-like piece 1 and stops its movement (FIG. 6A).

Figure 6B:
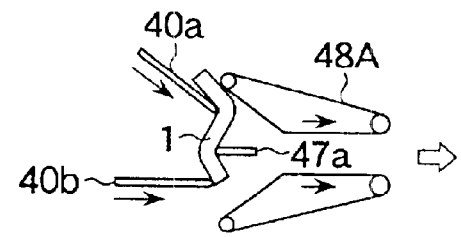

These cooperating actions of the pushing plates 40a, 40b and the stopper 47 start to form the bar-like piece 1 into an N-shaped piece. In this step, the stopper 47 bends the bar-like piece 1 with an off-center load, while the pushing plates 40a, 40b bend the bar-like piece 1 with loads asymmetrical with respect to the center of the length of the bar-like piece 1 (FIG. 6B).

Figure 6C:
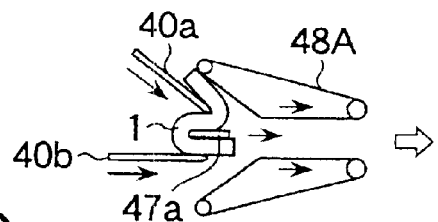

As the pushing plates 40a, 40b move further downstream to push the second positions of the piece 1, their shape becomes closer to an N-shaped piece, which is gripped between the receiving space 48a of the first vertical conveyor belts 48 (FIG. 6C).

Figure 6D:
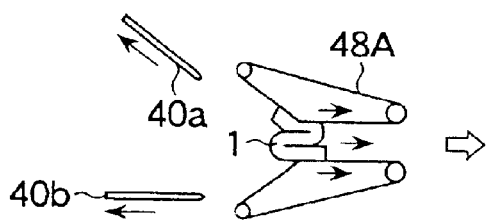

Once the bar-like piece 1 is formed into an N-shaped piece, the stopper 47 pivotally rotates away from the position shown in FIG. 6C to the second position, where the bar 47a in removed from the bar-like piece 47 (FIG. 6D).

Figure 6E:
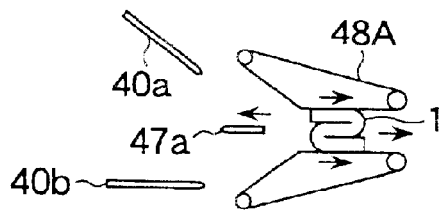

The N-shaped piece 1 then passes through the narrow passage 48b of the first vertical conveyor belts 48A such that it is even closer to an N-shape (FIG. 6E).

Also in the second embodiment, the controller 6 may move the pushing plates 40a, 40b in the these appropriate second positions based on the signal from the photosensors (FIG. 1). The degree of the pushing of the pushing plates 40a, 40b against the piece 1 may be adjusted based on the length of the bar-like piece 1 such that a well balanced N-shaped piece may be produced.

Although the invention has been shown in several forms, it will be obvious to those skilled in the art that various changes and modifications can be made without departing from the sprit and scope of the appended claims.

For example, in the above embodiments, the aligning of the first position with the bar 47a is performed to align both detected ends of the bar-like piece with the reference positions. Alternatively, the center of the length of the bar-like piece can be determined based on the length of the bar-like piece measured by the controller 6. Thus, an alternative alignment of the first position with the bar 47a may be performed so as to align a reference position with the determined center position of the bar-like piece 1. This alternative aligning is preferable if considerable variations in the lengths of the bar-like pieces exist. The reference position is at the center position of the bar-like piece 1 when the bar-like piece is to be formed into an M-shape. When the bar-like piece/is to be formed into an N-shape, the reference position is an off-center position of the bar-like piece 1.

Besides the bread dough piece in the embodiments, any other dough piece, even a dough piece which does not require to be fermented may be used as a bar-like dough piece to be formed into a bent form.

What is claimed is:

1. An apparatus for bending a bar-like dough piece along its length into a predetermined form, said apparatus comprising:

conveying means for continuously conveying bar-like dough pieces thereon in traveling direction that is substantially orthogonal to a length of each bar-like dough piece;

means for determining a plurality of actual positions to be bent on the length of each bar-like dough piece;

means for substituting said determined actual positions with predetermined positions; and bending means for bending each incoming bar-like dough piece at said predetermined positions that are symmetrical or asymmetrical with respect to the center of said length of said incoming bar-like dough piece into a predetermined form.

2. The apparatus of claim 1, wherein said predetermined positions are determined so that said bending means bends said incoming bar-like dough piece with a load substantially centrally located in the length of said bar-like dough piece.

3. The apparatus of claim 2, wherein said predetermined positions are also determined so that said bending means bends said incoming bar-like dough piece with loads substantially symmetrically located with respect to the center of said bar-like dough piece, wherein said substantially symmetrically located loads are orientated inversely with respect to said substantially centrally located load.

4. The apparatus of claim 3, wherein said bent dough piece takes substantially an M-shape.

5. The apparatus of claim 1, wherein said predetermined positions are determined so that said bending means bends said incoming bar-like dough piece with a load located off-center with respect to the center of the length of said incoming bar-like dough piece.

6. The apparatus of claim 5, wherein said predetermined positions are also determined so that said bending means bends said bar-like dough piece with loads asymmetrical with respect to the center of the length of said bar-like dough piece, wherein said asymmetrical loads are orientated inversely with respect to said substantially centrally located load.

7. The apparatus of claim 6, wherein said predetermined form is substantially N-shaped.

8. A method for bending a bar-like dough piece along its length into a predetermined form, said method comprising the steps of:

a) continuously conveying bar-like dough pieces in a traveling direction that is substantially orthogonal to a length of each bar-like dough piece;

b) determining a plurality of actual positions to be bent on the length of each bar-like dough piece;

c) substituting said determined actual positions with predetermined positions; and d) bending said bar-like dough piece at said predetermined positions that are symmetrical or asymmetrical with respect to the center of said length of said bar-like dough piece into a predetermined form.

9. The method of claim 8, wherein said determining step includes a step of determining the center of said length of said bar-like dough piece.

10. The method of claim 8, wherein said determining step includes a step of determining the length of said bar-like dough piece.

\* \* \* \* \*